US009618015B2

(12) United States Patent
Morselli et al.

(10) Patent No.: US 9,618,015 B2
(45) Date of Patent: Apr. 11, 2017

(54) OIL LEVEL CONTROL DEVICE

(71) Applicant: CNH Industrial America LLC, New Holland, PA (US)

(72) Inventors: Riccardo Morselli, San Vito di Spilamberto (IT); John Posselius, Ephrata, PA (US); Davide Columbo, Aosta (IT); Patrizio Turco, Bruino (IT)

(73) Assignee: CNH Industrial America LLC, New Holland, PA (US)

( * ) Notice: Subject to any disclaimer, the term of this patent is extended or adjusted under 35 U.S.C. 154(b) by 234 days.

(21) Appl. No.: 14/345,286

(22) PCT Filed: Sep. 17, 2012

(86) PCT No.: PCT/EP2012/068261
§ 371 (c)(1),
(2) Date: Mar. 17, 2014

(87) PCT Pub. No.: WO2013/041493
PCT Pub. Date: Mar. 28, 2013

(65) Prior Publication Data

US 2014/0338320 A1 Nov. 20, 2014

(30) Foreign Application Priority Data

Sep. 19, 2011 (IT) ............................ MO2011A0236

(51) Int. Cl.
*F16D 31/02* (2006.01)
*F15B 1/26* (2006.01)
*F15B 21/00* (2006.01)

(52) U.S. Cl.
CPC .............. *F15B 1/26* (2013.01); *F15B 21/005* (2013.01); *F15B 2201/411* (2013.01);
(Continued)

(58) Field of Classification Search
CPC ...... F15B 1/26; F15B 21/005; F15B 2211/611
See application file for complete search history.

(56) References Cited

U.S. PATENT DOCUMENTS 3,604,205 A 9/1971 Geselbracht et al.
3,960,174 A 6/1976 Latimer et al.

FOREIGN PATENT DOCUMENTS

FR 2233696 1/1975
JP 62209268 A * 9/1987

OTHER PUBLICATIONS

PCT International Search Report issued for PCT/EP2012/068261 dated Dec. 5, 2012 (7 pages).

(Continued)

*Primary Examiner* — Michael Leslie
(74) *Attorney, Agent, or Firm* — Rickard K. DeMille; Rebecca L. Henkel

(57) ABSTRACT

An oil level control device in a main tank of a supply circuit, the supply circuit comprising a main tank, a first pump which, in aspiration, is connected to the main tank, a main hydraulic circuit which is connected in inlet to the delivery of a charge pump and in outlet is connected to the main tank, a first auxiliary conduit, an auxiliary tank which receives oil from the first auxiliary conduit and which in discharge is placed in communication with the main tank. At least a control valve predisposed to control sending of oil from the first auxiliary conduit to the auxiliary tank or from the auxiliary tank to the main tank.

20 Claims, 6 Drawing Sheets

(52) U.S. Cl.
CPC ............... *F15B 2211/20538* (2013.01); *F15B 2211/20546* (2013.01); *F15B 2211/20592* (2013.01); *F15B 2211/611* (2013.01)

(56) References Cited

OTHER PUBLICATIONS

European Search Report for Italian Application No. IT MO20110236 dated Apr. 3, 2012 (7 pages).

* cited by examiner

OIL LEVEL CONTROL DEVICE

CROSS REFERENCE TO RELATED APPLICATIONS

This application is the US National Stage filing of International Application Serial No. PCT/EP2012/068261, entitled "OIL LEVEL CONTROL DEVICE" filed Sep. 17, 2012, which claims priority to Italian Application Serial No. MO2011A000236, filed Sep. 19, 2011, each of which is incorporated by reference herein in its entirety for all purposes.

FIELD OF THE INVENTION

The invention relates to a device for controlling a level of oil in a main tank of a supply circuit.

In particular, the invention relates to the field of operator vehicles provided with one or more hydraulic actuators for performing various operations, for example activation of a digger blade, a turret, a lift arm or other.

BACKGROUND OF THE INVENTION

In operator vehicles such as earth-moving machines or agricultural machines, there is normally a hydraulic fluid supply circuit, the fluid being hydraulic oil, comprised in a main tank. The main tank is typically constituted by the motor casing and/or the gear box. A first constant-flow pump takes oil from the main tank. A second variable-flow pump is connected in aspiration with the delivery of the first pump. The second pump is predisposed to supply the oil to one or more hydraulic distributors which are connected in outlet to one or more actuators.

The first pump also supplies a lubrication circuit, predisposed to send oil to various zones of the operator vehicle with the aim of lubricating various organs of the operator vehicle. The lubrication circuit is connected in inlet to an intermediate point between the first pump and the second pump, while it is connected in discharge to the main tank. An auxiliary conduit, provided with a check valve, is arranged in parallel with the lubrication circuit.

The supply circuit functions as follows. The first pump continuously develops a constant flow of oil which is divided between the lubrication circuit and the second pump, which second pump supplies the oil to the distributors. During the working stages of the vehicle, in which the activation of the actuator is not required, all the oil flow developed by the first pump is directed towards the lubrication system. This flow, which considerably exceeds the flow required by the lubrication circuit, flows in part back through the auxiliary conduit, and the relative check valve, to the main tank. During the working stages, in which the activation of the actuators is required, a part of the oil flow developed by the first pump is directed, by means of the second pump, to the hydraulic distributors.

The quantity of oil present overall in the vehicle supply circuit must be sufficient to enable both lubrication of the vehicle and all the parts requiring lubrication, as well as activation of the actuators on board the vehicle. This is therefore a not insignificant amount of oil, which occupies a certain volume of the main tank. As already mentioned herein above, the main tank of the supply circuit is constituted generally by the engine casing and/or the gear box. The drive shaft and the vehicle gear box are therefore immersed in an abundant quantity of oil, rotation of shafts and gears represents a significant element for energy dissipation.

The aim of the present invention is to provide a control device of an oil level in a main tank of a supply circuit which limits the quantity of oil present internally of the main tank to what is strictly necessary for the operations which have to be performed at any given time, such that the energy dissipation produced by the agitating of the oil is proportionally reduced.

An advantage of the device of the present invention is that it does not lead to an increase in the space taken up on board the vehicle.

A further advantage of the device is that it can be installed on board vehicles which have not been originally predisposed for the device.

SUMMARY OF THE INVENTION

An oil level control device of a hydraulic supply circuit is provided. The hydraulic supply circuit comprises a main tank, and a pump which, in aspiration, is connected to the main tank. A main hydraulic circuit is connected in inlet to the delivery of the pump. The control device comprises an auxiliary tank which in discharge is placed in communication with the main tank, a first auxiliary conduit which connects at least a section of said main hydraulic circuit with the auxiliary tank, and a control valve operable to control a flow of oil from the first auxiliary conduit to the main tan.

BRIEF DESCRIPTION OF THE DRAWINGS

Further characteristics and advantages of the present invention will better emerge from the indicative and therefore non-limiting description, with reference to the accompanying figures of the drawings, in which.

DETAILED DESCRIPTION OF THE PREFERRED EMBODIMENT(S)

With reference to the figures the control device of the present invention is illustrated in combination with a supply circuit of an operating fluid in an operator vehicle. The supply circuit comprises a main tank 4 which is normally constituted by the engine casing, which supplies a first, charge pump 1. The charge pump 1, which is generally a constant-flow pump, develops an oil flow which is sent to a main hydraulic circuit 100 comprising some hydraulic circuits of the operator vehicle. The main hydraulic circuit 100 is connected in inlet to the delivery of said charge pump 1 and at least one outlet is connected to the main tank 4.

Figure 5:
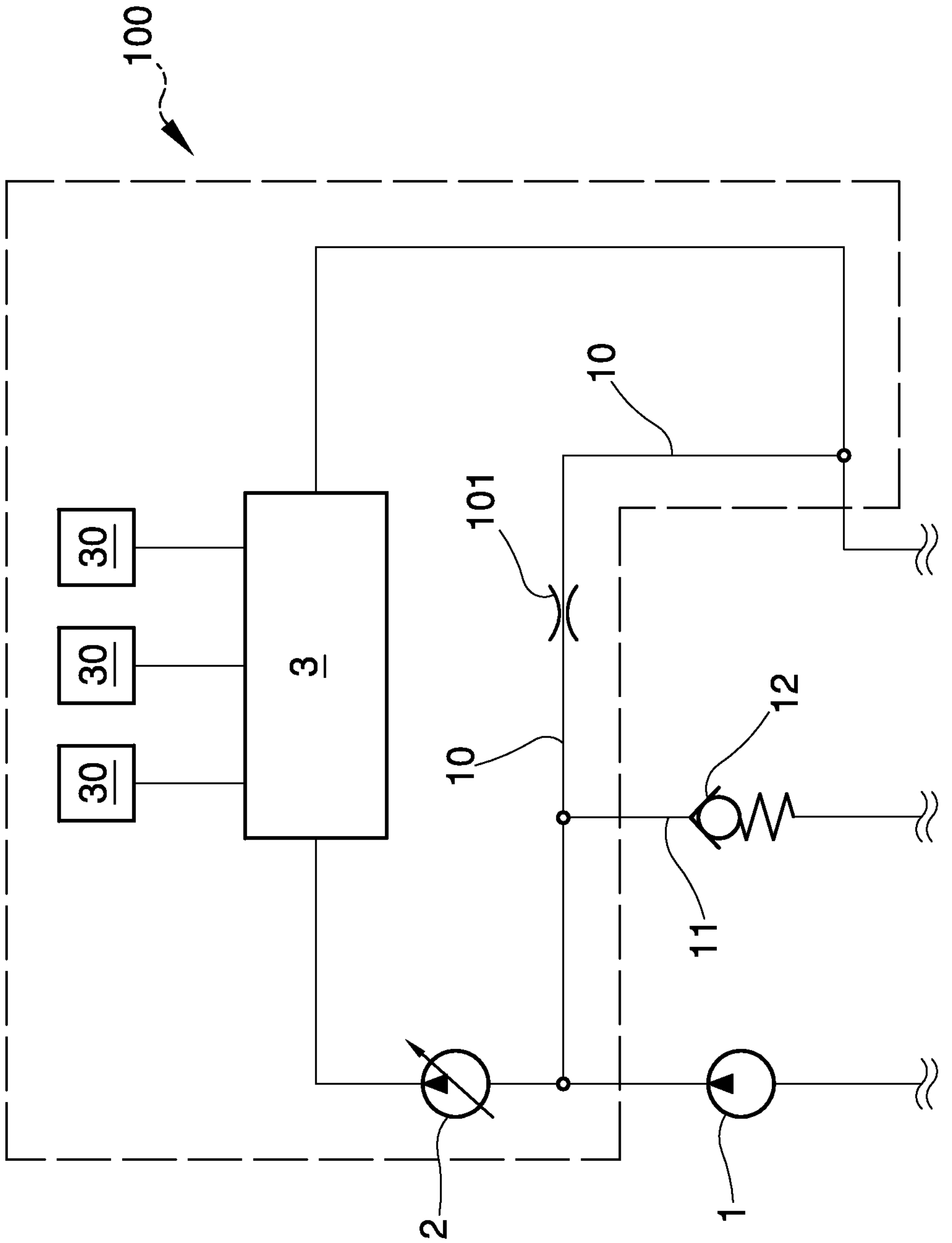
FIG. 5 is a schematic diagram of a main hydraulic circuit which can be managed by means of the present invention.

For example, as illustrated in FIG. 5, the main hydraulic system 100 can comprise a lubricating circuit 10 of the vehicle. One or more fluid distributors 3 are interposed between the first pump 1 and the hydraulic actuators 30, which distributors 3 are controllable by the vehicle operator who commands them to send the oil to the hydraulic actuators 30 required to be activated for a specific task.

The oil is sent to the distributors 3 by means of a second, main pump 2, being a variable-flow pump, which is interposed between the charge pump 1 and the hydraulic distributors 3. During the functioning stages of the vehicle in which no activation of any actuator is required, the main pump 2 does not deliver oil to the distributors 3, and the whole oil flow developed by the first pump 1 is sent to the vehicle lubrication circuit 10. There exist also small operator vehicles, such as small tractors, in which only the pump 1 is present. In this case the hydraulic distributors 3 are fed by the pump 1 together with the lubricating circuit.

The lubrication circuit 10 of the vehicle receives the oil from a connection located in an intermediate position between the charge pump 1 and the main pump 2. The lubricating load has been generically denoted by a valve 101. The lubricating circuit 10 is connected in discharge to the main tank 4.

The oil supply circuit further comprises a first auxiliary conduit 11 which is arranged in parallel with the lubricating circuit 10. The first auxiliary conduit 11 may be provided with a check valve 12. The first auxiliary conduit 11 is operable to return the oil to the main tank 4, by-passing at least a tract of the main hydraulic circuit 100. The function of the check valve 12 is to enable passage of oil through the first auxiliary conduit 11 only in a case in which the fluid pressure in the main hydraulic circuit 100 is greater than the calibration of the valve 12 itself. This guarantees the necessary fluid supply to the lubricating circuit 10.

The oil level control device of the present invention comprises an auxiliary tank 5. The auxiliary tank 5, in discharge, is placed in communication with the main tank 4. A first auxiliary conduit 11 connects at least a section of said main hydraulic circuit 3 with said auxiliary tank 5.

The auxiliary tank 5 is interposed between the auxiliary conduit 11 and the main tank 4. At least a control valve 8 is operable to control the oil passage from the first auxiliary conduit 11 to the main tank 4 through the auxiliary tank 5. At least a relief valve 7 is arranged on the auxiliary tank 5 such as to enable discharge of the operating fluid towards the main tank 4 should a predetermined level be exceeded.

Figure 1:
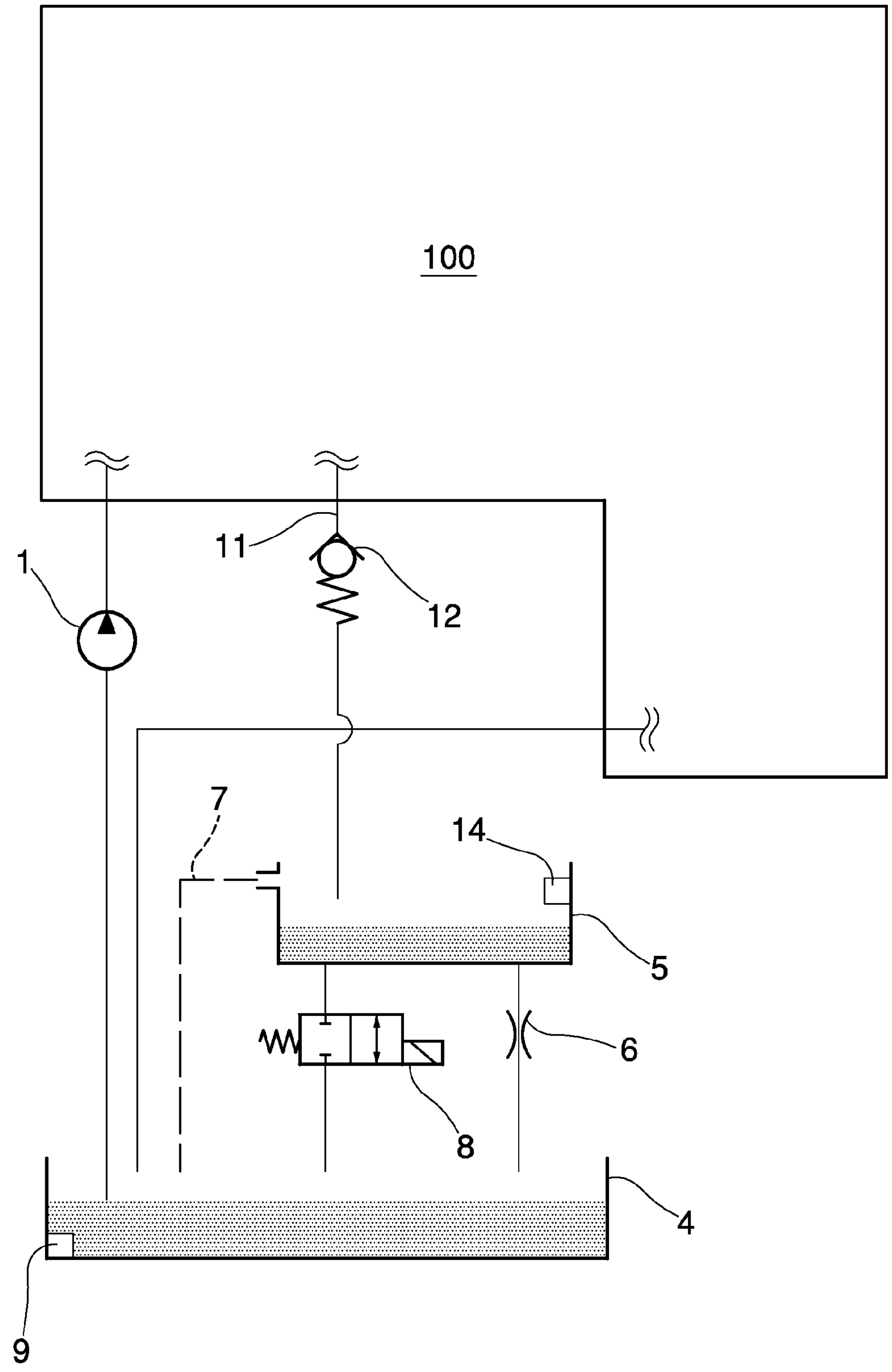
FIG. 1 is a schematic diagram of a first embodiment of the present invention.

In a first embodiment of the control device, illustrated in FIG. 1, the control valve 8 is interposed between auxiliary tank 5 and the main tank 4. The control valve 8, which is preferably electromechanically activated, can be normally closed or normally open. In the first case the auxiliary tank 5 may optionally be provided with a discharge valve 6 which enables discharge of at least a minimum oil flow from the auxiliary tank to the main tank 4 in a case of malfunctioning of the control valve 8. In any case, discharge valve 6 may further represent leakages between the tanks.

The functioning of the device, in this first embodiment, is the following. In conditions of low oil demand, for example while the vehicle is moving and no activation of the hydraulic actuators 30 is required and or the main pump 2 does not send oil to the distributors 3, the whole oil flow developed by the charge pump 1 exceeds the flow rate required by main hydraulic circuit 100, and the excess flow is sent via the first auxiliary conduit 11 to the auxiliary tank 5. The pressure along the auxiliary conduit 11 is, in this case, sufficient to bring the check valve 12 into an open configuration. The control valve 8 is activated into a closed configuration such that the auxiliary tank 5 fills up to a predetermined level, thus freeing the main tank 4 of the oil which is not required for the main hydraulic circuit 100.

If the demand for operating oil increases, for example in a case of activation of the hydraulic actuators 30, the control valve 8 is activated into an open configuration, in which it enables passage of the oil from the auxiliary tank 5 to the main tank 4. The auxiliary tank 5 progressively empties, while the fluid level in the main tank 4 increases.

Figure 2:
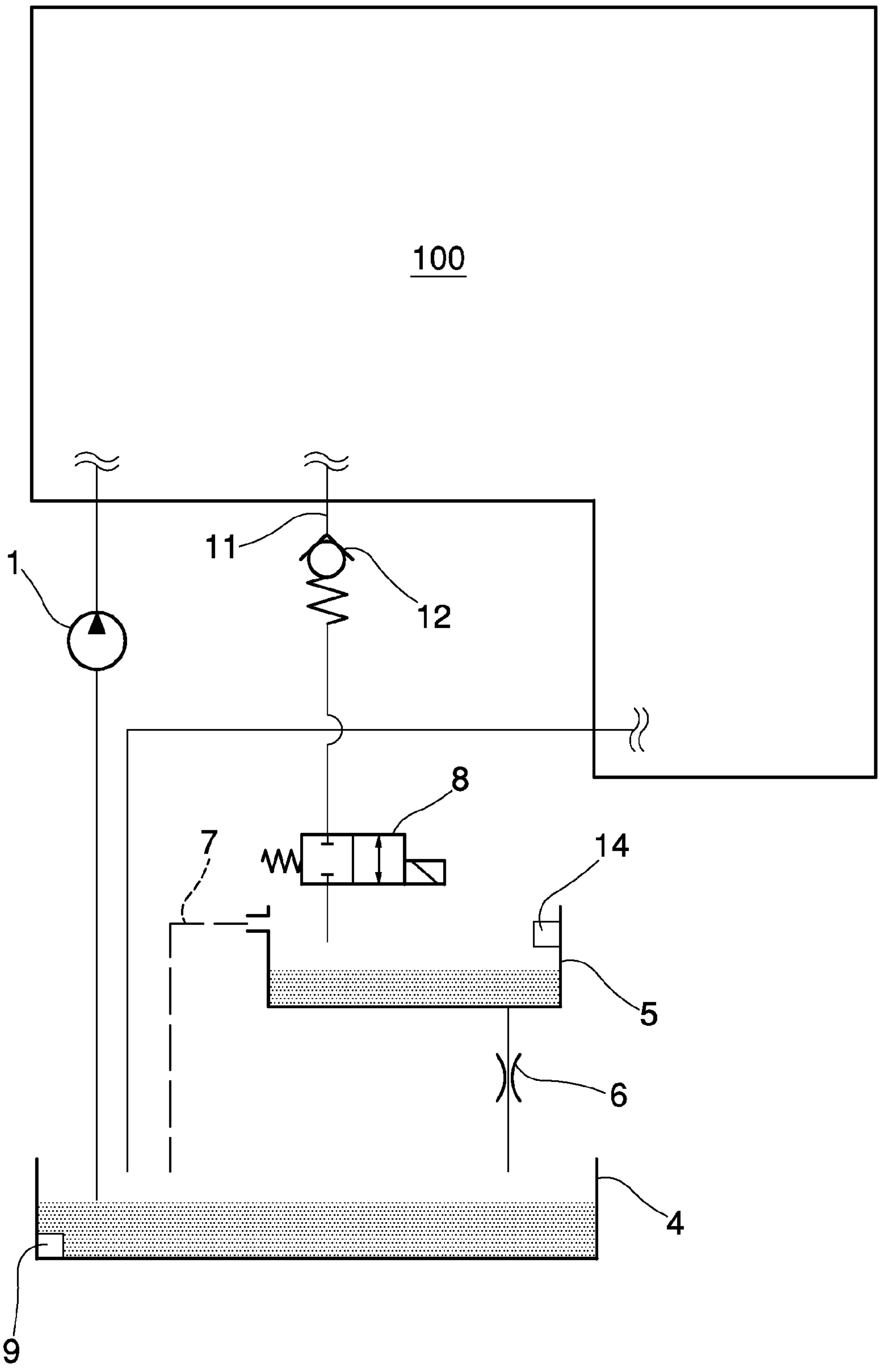
FIG. 2 is a schematic diagram of a second embodiment of the present invention.
Figure 3:
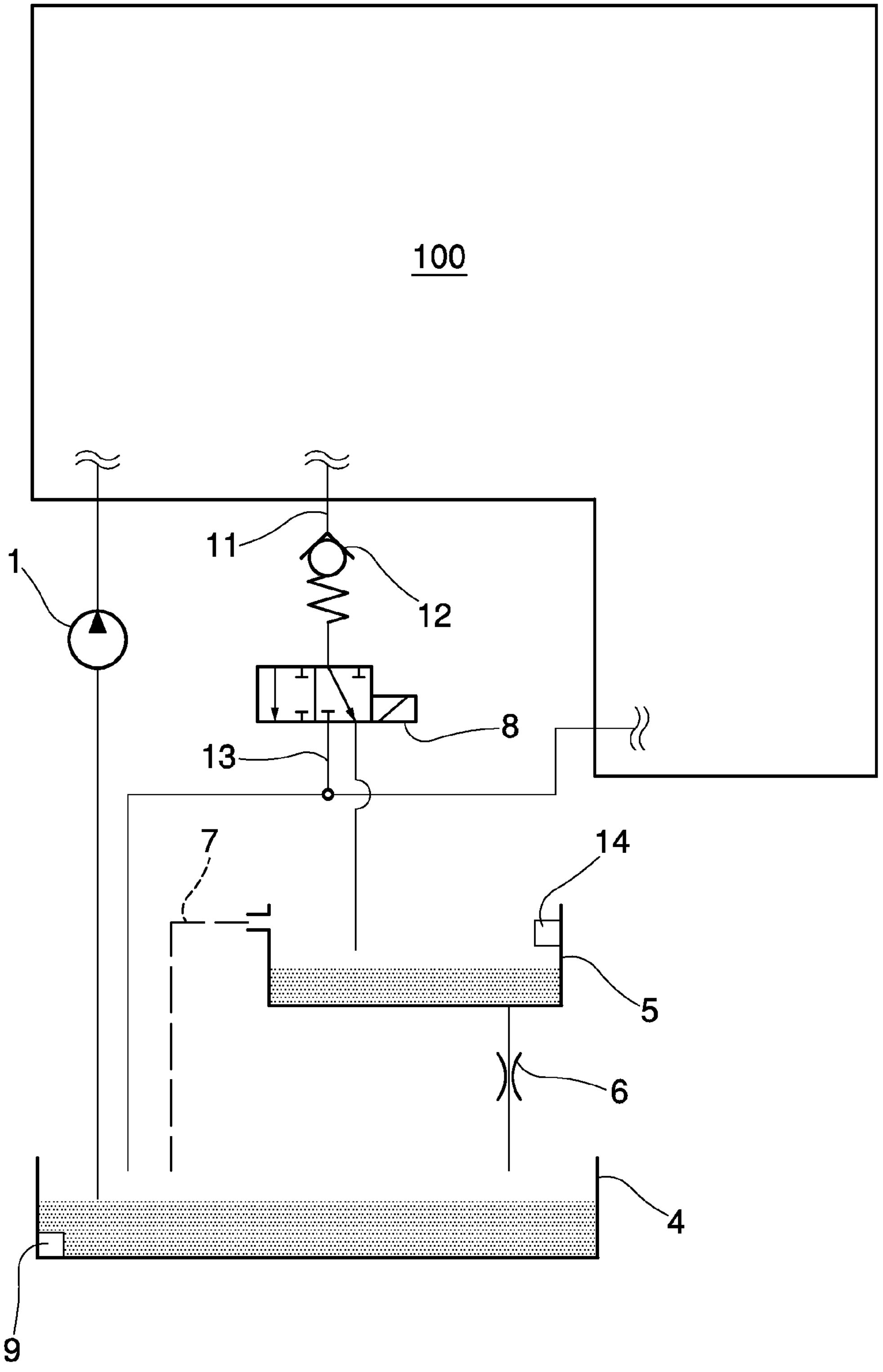
FIGS. 3 and 4 are schematic diagram of a third embodiment of the present invention, in two distinct functional configurations.
Figure 4:
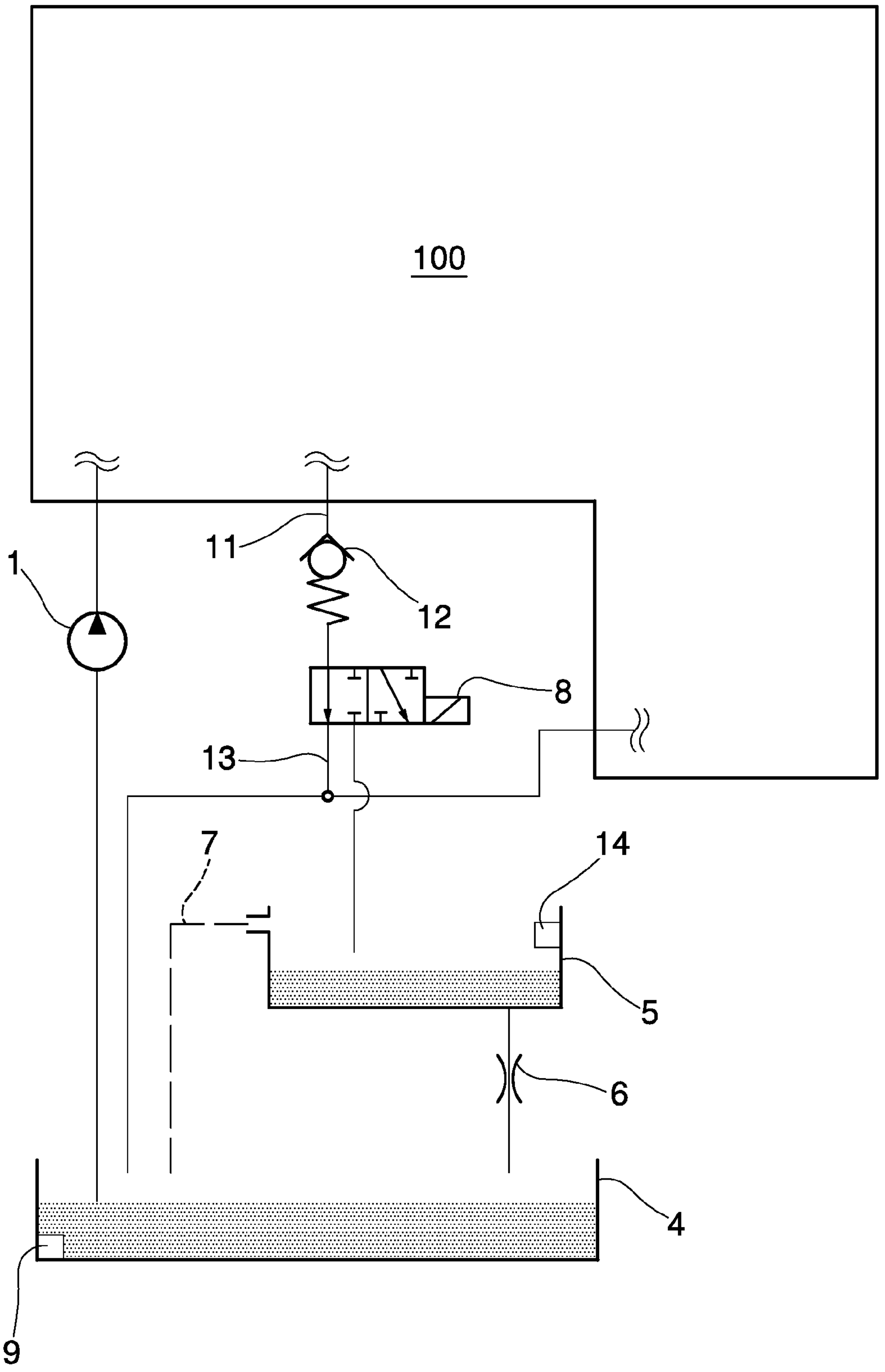

In a second embodiment of the control device, illustrated in FIG. 2, the control valve 8 is interposed between the first auxiliary conduit 11 and the auxiliary tank 5. In this case too the control valve 8, which is preferably electromechanically activated, can be normally closed or normally open. In this second embodiment of the control device the auxiliary tank 5 is provided not only with a relief valve 7 but also with a discharge valve 6 which enables constant passage of a predetermined flow of oil from the auxiliary tank 5 to the main tank 4. As described with regard to the first embodiment of the device, where there is a low demand for oil, the control valve 8 is activated into an open configuration, while when there is a high demand for oil the control valve 8 is activated into a closed configuration.

In a third embodiment of the control device, the control valve 8 is interposed between the first auxiliary conduit 11 and the auxiliary tank 5. The auxiliary tank 5 is further provided with a discharge valve 6 which enables constant passage of a predetermined oil flow from the auxiliary tank 5 to the main tank 4.

In the third embodiment, the control valve 8 is a four-way two-position valve. In inlet the valve 8 is connected to the first auxiliary conduit 11. Two outlets of the control valve 8 are connected respectively to the auxiliary tank 5 and to a second auxiliary conduit 13 which in turn is connected to the main tank 4.

In a first operating configuration, the control valve 8 sets the first auxiliary conduit 11 in communication with the auxiliary tank 5. The first operating configuration of the control valve 8 is indicated during the working stages of the vehicle, when there is a low demand for oil. As described for the two preceding embodiments, the oil flow developed by the first pump 1 considerably exceeds the flow demanded by the main hydraulic circuit 100 in condition of low demand, and the excess flow is sent through the first auxiliary conduit 11 to the auxiliary tank 5. The pressure along the auxiliary conduit 11 moves the check valve 12 into an open configuration. The auxiliary tank 5 thus fills up to a predetermined level, freeing the main tank 4 of the oil which is not required for the main hydraulic circuit 100. A predetermined oil flow passes, however, from the auxiliary tank 5 to the main tank 4 through the discharge valve 6 and through the relief valve 7.

When there is an increase in the demand for oil in the main hydraulic circuit 100, for example by the hydraulic actuators 30, the oil flow which, via the auxiliary conduit 11 supplies the auxiliary tank 5, falls and the auxiliary tank progressively empties through the discharge valve 6. In this way the oil level in the main tank 4 increases.

If the oil demand grows further, for example during operations in which a considerable use of the hydraulic actuators 30 is required, the control valve 8 is activated into a second operating configuration, in which it sets the first auxiliary conduit 11 in communication with the second auxiliary conduit 13, by-passing the auxiliary tank 5 which, consequently, progressively empties through the discharge valve 6. In this way, substantially all the oil is conveyed and collected by the main tank 4.

In all the described embodiments, the auxiliary tank 5 can be provided with a level sensor 14 operable to detect the level of oil internally of the auxiliary tank 5 and to send a signal to a control unit which is operable to command the opening or the closing of the control valve 8 on the basis of the signal received. In the embodiment illustrated in FIG. 1, in the case of exceeding a predetermined oil level the control valve 8 is activated to open, while in the embodiments illustrated in the other figures it is activated to close. The above-mentioned control unit is typically an electronic control panel which presides over numerous operations of the vehicle.

In all the described embodiments, the control device can further be provided with a temperature sensor 9 predisposed to detect the temperature of the operating fluid internally of the main tank 4 and to send a corresponding signal to the control unit, which is predisposed to command the opening or closing of the control valve 8 on the basis of the signal received. In the embodiment illustrated in FIG. 1, in a case of exceeding a predetermined temperature value, the control valve 8 is activated to open, while in the embodiments illustrated in the other figures it is activated to close. Alternatively, the auxiliary tank 5 can be provided with a heat-sensitive valve which, in a case of exceeding a determined oil temperature value, automatically opens and thus frees up a passage towards the main tank 4.

Figure 6A:
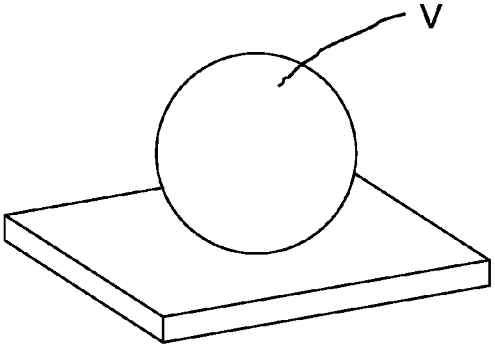
FIGS. 6*a*,6*b*,7 are schematic drawings of discharge valves which can be employed with the present invention.
Figure 6B:
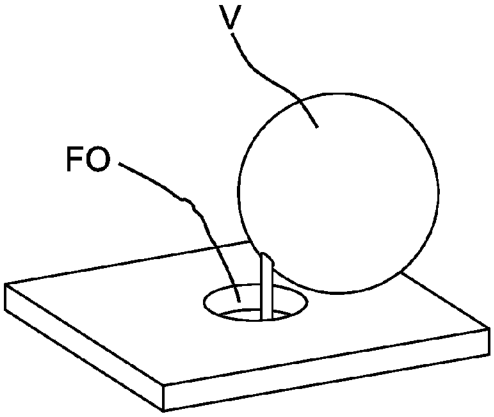
Figure 7:
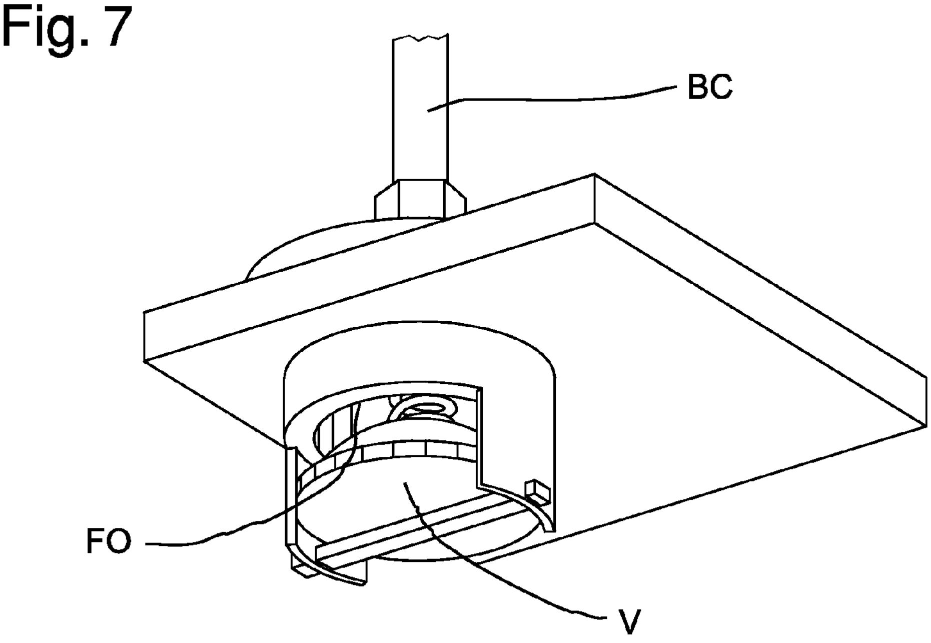

In all embodiments, the auxiliary tank 5 can advantageously be provided with one or more further discharge openings towards the main tank 4, which openings are positioned such as to enable a transfer of oil from the auxiliary tank 5 to the main tank 4 in a case in which the vehicle assumes an inclination which exceeds a determined angle with respect to a horizontal plane. This is particularly useful as if the fluid level in the main tank 4 is not sufficiently high, a particularly accentuated inclination of the vehicle might cause some parts to emerge from the oil and thus compromise lubrication. Said further discharge openings FO are controlled by means of valve which may be of a passive kind or of an active kind. In the case of a passive valve, a closure element is mobile between a closing position and an open position under effect of gravity, following the tilting of the vehicle. The closure element V could be, for example, in the form of a sphere which can roll between the open and closing position, as illustrated in FIG. 6. An alternative form of the closure element could be a swinging lid which moves in the open position if the vehicle tilts over a predetermined angle. In the case of an active valve, a closure element V is still mobile between a closing position and an open position following the tilting of the vehicle, but the closure element is electrically operated according to a signal sent by a sensor which detects the tilting angle of the vehicle. The opening of the closure element V may be operated by means of a bowden cable BC.

At least one of the above cited further discharge openings may be provided with a temperature sensitive device, such as shape memory alloys, that mechanically opens a discharge path between the auxiliary tank and the main tank when the oil temperature in the main tank is too high.

In all the described embodiments, the auxiliary tank 5 can be located internally 9 of the engine casing or the gear box, in particular the auxiliary tank 5 can be conformed in such a way as to occupy the free spaces internally of the engine casing or the gear box. This arrangement is advantageous as it avoids additional space occupied on board the vehicle. The auxiliary tank 5 located internally of the engine casing or the gear box might further be made in the form of two half-shells which can be coupled without any particular constructional attention, as any fluid leakage would deposit internally of the main tank.

The control device of the present invention provides important advantages.

It enables precise and reliable control of the quantity of oil present internally of the main tank 4, such that there is always an amount of oil available that is strictly necessary for correct performing of the operations the vehicle is required to carry out. This enables energy dissipation due to continual mixing of the oil, which occurs in known-type devices, to be very considerably limited.

The control device is also simple and easily integrated into vehicles which were not originally predisposed for it.

The invention claimed is:

1. An oil level control device of a hydraulic supply circuit, the hydraulic supply circuit comprising:
- a main tank;
- a pump which, in aspiration, is connected to the main tank; and
- a main hydraulic circuit, which is connected to the pump;
- wherein the oil level control device comprises:
  - an auxiliary tank;
  - a discharge valve disposed between the auxiliary tank and the main tank, wherein the discharge valve is configured to facilitate a continuous flow of oil from the auxiliary tank to the main tank at a discharge rate;
  - a first auxiliary conduit which connects at least a section of the main hydraulic circuit with the auxiliary tank; and
  - a control valve separate from the discharge valve and operable to control a flow of the oil from the first auxiliary conduit to the main tank.

2. The oil level control device of claim 1, wherein the control valve is operable to control an oil level in the auxiliary tank by controlling a supply of the oil to the auxiliary tank or a drain of the oil from the auxiliary tank.

3. The oil level control device of claim 2, wherein the control valve is interposed between the auxiliary tank and the main tank.

4. The oil level control device of claim 1, wherein the control valve is interposed between the first auxiliary conduit and the auxiliary tank.

5. The oil level control device of claim 4, wherein the control valve comprises two outlets which are connected respectively to the auxiliary tank and to a second auxiliary conduit which is connected in outlet to the main tank.

6. The oil level control device of claim 1, comprising a relief valve set separate from the discharge valve and the control valve, wherein the relief valve set is configured to facilitate flow of the oil from the auxiliary tank to the main tank while a level of the oil within the auxiliary tank exceeds a threshold level.

7. The oil level control device of claim 1, comprising a control unit which is operable to command the control valve based on at least one of the following parameters:
- vehicle speed;
- engine rpm;
- oil temperature;
- vehicle longitudinal or lateral inclination;
- oil flow or pressure drop in any section of any hydraulic circuit of the vehicle;
- oil flow or output pressure of the pump;
- oil level in the main tank;
- oil level in the auxiliary tank;
- ambient temperature;
- cooling fan speed;
- operator input command.

8. The oil level control device of claim 7, wherein either the auxiliary tank or the main tank comprises a level sensor operable to detect the oil level in the main tank or the oil level in the auxiliary tank and to send a signal to the control unit.

9. The oil level control device of claim 7, comprising a temperature sensor operable to detect the oil temperature of the oil of the main tank and to send a signal to the control unit.

10. The oil level control device of claim 3, comprising a device configured to discharge oil from the auxiliary tank to the main tank in a case in which the main tank assumes an inclination which exceeds a threshold angle with respect to a horizontal plane.

11. An oil level control device of a hydraulic supply circuit, the hydraulic supply circuit comprising:

a main tank;

a pump which, in aspiration, is connected to the main tank; and a main hydraulic circuit, which is connected to the pump;

wherein the oil level control device comprises:

an auxiliary tank which in discharge is placed in fluid communication with the main tank;

a first auxiliary conduit which connects a section of the main hydraulic circuit with the auxiliary tank;

a check valve fluidly coupled to the first auxiliary conduit and configured to facilitate passage of oil through the first auxiliary conduit only while a fluid pressure within the section of the main hydraulic circuit is greater than a threshold pressure; and a control valve operable to control a flow of the oil from the first auxiliary conduit to the main tank.

12. The oil level control device of claim 11, wherein the control valve is operable to control an oil level in the auxiliary tank by controlling a supply of the oil to the auxiliary tank or a drain of the oil from the auxiliary tank.

13. The oil level control device of claim 12, wherein the control valve is interposed between the auxiliary tank and the main tank.

14. The oil level control device of claim 11, wherein the control valve is interposed between the first auxiliary conduit and the auxiliary tank.

15. The oil level control device of claim 14, wherein the control valve comprises two outlets which are connected respectively to the auxiliary tank and to a second auxiliary conduit which is connected in outlet to the main tank.

16. An oil level control device of a hydraulic supply circuit, the hydraulic supply circuit comprising:

a main tank;

a pump which, in aspiration, is connected to the main tank; and a main hydraulic circuit, which is connected to the pump;

wherein the oil level control device comprises:

an auxiliary tank which in discharge is placed in communication with the main tank;

a first auxiliary conduit fluidly coupled to at least a section of the main hydraulic circuit; and a control valve comprising an inlet in fluid communication with the first auxiliary conduit, and two outlets in fluid communication with the auxiliary tank and a second auxiliary conduit, respectively;

wherein the second auxiliary conduit is fluidly coupled to the main tank, and the control valve is configured to selectively flow oil from the first auxiliary conduit to one of the auxiliary tank and the main tank.

17. The oil level control device of claim 16, comprising a relief valve set configured to facilitate flow of the oil from the auxiliary tank to the main tank while a level of the oil within the auxiliary tank exceeds a threshold level.

18. The oil level control device of claim 16, comprising a control unit which is operable to command the control valve based on at least one of the following parameters:

vehicle speed;

engine rpm;

oil temperature;

vehicle longitudinal or lateral inclination;

oil flow or pressure drop in any section of any hydraulic circuit of the vehicle;

oil flow or output pressure of the pump;

oil level in the main tank;

oil level in the auxiliary tank;

ambient temperature;

cooling fan speed;

operator input command.

19. The oil level control device of claim 18, wherein either the auxiliary tank or the main tank comprises a level sensor operable to detect the oil level in the main tank or the oil level in the auxiliary tank and to send a signal to the control unit.

20. The oil level control device of claim 18, comprising a temperature sensor operable to detect the oil temperature of the oil of the main tank and to send a signal to the control unit.

* * * * *